US007283453B2

(12) United States Patent
Onoe et al.

(10) Patent No.: US 7,283,453 B2
(45) Date of Patent: Oct. 16, 2007

(54) RECORDING/REPRODUCING HEAD

(75) Inventors: Atsushi Onoe, Saitama (JP); Yasuo Cho, 4-5-304, Komegafukuro 2-chome, Aoba-ku, Sendai-shi, Miyagi (JP)

(73) Assignees: Pioneer Corporation, Tokyo (JP); Yasuo Cho, Miyagi (JP)

( * ) Notice: Subject to any disclaimer, the term of this patent is extended or adjusted under 35 U.S.C. 154(b) by 433 days.

(21) Appl. No.: 10/615,600

(22) Filed: Jul. 9, 2003

(65) Prior Publication Data

US 2004/0246879 A1 Dec. 9, 2004

(30) Foreign Application Priority Data

Jul. 9, 2002 (JP) ............................ 2002-200043

(51) Int. Cl.
*G11B 9/00* (2006.01)

(52) U.S. Cl. ...................................................... 369/126

(58) Field of Classification Search ..................... None
See application file for complete search history.

(56) References Cited

U.S. PATENT DOCUMENTS 4,320,491 A 3/1982 Rustman ..................... 369/126
5,321,685 A * 6/1994 Nose et al. ................. 369/126
5,329,122 A * 7/1994 Sakai et al. ................. 250/306
5,418,029 A 5/1995 Yamamoto et al. ........ 428/64.2
5,481,527 A 1/1996 Kasanuki et al. ........... 369/126
5,488,602 A 1/1996 Yamano et al. ............. 369/126
5,646,932 A 7/1997 Kuribayashi et al. ....... 369/126
5,751,685 A * 5/1998 Yi ............................. 369/126
5,808,977 A 9/1998 Koyanagi et al. ........... 369/127
5,914,920 A 6/1999 Yokogawa ............... 369/275.3
5,946,284 A 8/1999 Chung et al. ............... 369/126
5,953,306 A * 9/1999 Yi ............................. 369/126
6,197,989 B1 3/2001 Furukawa et al. .......... 556/450
6,477,132 B1 11/2002 Azuma et al. .............. 369/126
6,510,130 B2 1/2003 Hayashi et al. .......... 369/275.3

(Continued)

FOREIGN PATENT DOCUMENTS

GB 1 484 256 9/1977

(Continued)

OTHER PUBLICATIONS

62th Japan Society of Applied Physics Lecture Meeting (2001.9 Aichi Institute of Technology) 12p-ZR-2.

(Continued)

*Primary Examiner*—Joseph Haley
(74) *Attorney, Agent, or Firm*—Nixon & Vanderhye, PC

(57) ABSTRACT

A recording/reproducing head is provided with: a substrate which has a predetermined width and a predetermined thickness and which is long in one direction; a probe disposed on one end in the longitudinal direction of the substrate; a lead wire disposed on a surface of the substrate provided with the probe thereon, i.e. the lead wire disposed on a surface facing to the dielectric recording medium; and an electric conductor, i.e. a return electrode, disposed so as to surround the probe and the lead wire. The probe is covered with a conductive film as well as connected with the lead wire. Via the lead wire, a signal for recording is inputted from an external device or a signal for reproducing is led to an external device.

12 Claims, 11 Drawing Sheets

81 85 82b 82 83

U.S. PATENT DOCUMENTS

| | | | | |
|---|---|---|---|---|
| 6,515,957 | B1 | 2/2003 | Newns et al. | 369/126 |
| 6,653,630 | B2 | 11/2003 | Rosenman et al. | 250/306 |
| 6,665,239 | B1 * | 12/2003 | Takahashi et al. | 369/44.23 |
| 6,762,402 | B2 | 7/2004 | Choi et al. | 250/234 |
| 6,841,220 | B2 | 1/2005 | Onoe et al. | 428/66.7 |
| 6,912,193 | B2 | 6/2005 | Cho et al. | 369/126 |
| 6,950,385 | B1 * | 9/2005 | Chiba et al. | 369/126 |
| 6,965,545 | B2 | 11/2005 | Hino et al. | 369/13.54 |
| 7,065,033 | B2 | 6/2006 | Onoe et al. | 369/126 |
| 7,149,180 | B2 | 12/2006 | Onoe et al. | 369/276 |
| 2002/0105249 | A1 | 8/2002 | Yoshida et al. | 310/311 |
| 2002/0118906 | A1 | 8/2002 | Onoe | 385/14 |
| 2002/0131669 | A1 | 9/2002 | Onoe et al. | 385/14 |
| 2003/0021213 | A1 | 1/2003 | Hagiwara | 369/101 |
| 2003/0053400 | A1 | 3/2003 | Cho et al. | 369/126 |
| 2004/0027935 | A1 | 2/2004 | Cho et al. | 369/126 |
| 2004/0042351 | A1 | 3/2004 | Onoe et al. | 369/13.01 |
| 2004/0047245 | A1 * | 3/2004 | Onoe et al. | 369/13.01 |
| 2004/0090903 | A1 | 5/2004 | Cho et al. | 369/126 |
| 2004/0105373 | A1 | 6/2004 | Maeda et al. | 369/101 |
| 2004/0105380 | A1 | 6/2004 | Cho et al. | 369/126 |
| 2004/0114913 | A1 | 6/2004 | Kume | 386/125 |
| 2004/0252621 | A1 | 12/2004 | Cho et al. | 369/126 |
| 2004/0263185 | A1 | 12/2004 | Cho et al. | 324/636 |
| 2005/0047288 | A1 | 3/2005 | Maeda et al. | 369/53.25 |
| 2005/0098532 | A1 | 5/2005 | Onoe et al. | 216/22 |
| 2005/0099895 | A1 | 5/2005 | Maeda et al. | 369/13.01 |
| 2005/0122886 | A1 | 6/2005 | Takahashi et al. | 369/126 |

FOREIGN PATENT DOCUMENTS

| | | |
|---|---|---|
| JP | 56-107338 | 8/1981 |
| JP | 57-200956 | 12/1982 |
| JP | 08-075806 | 3/1996 |
| JP | 10-334525 | 12/1998 |
| JP | 2003085969 | 3/2003 |

OTHER PUBLICATIONS

Kazuta et al, "Determination of crystal polarities of piezoelectric thin film using scanning nonlinear dielectric microscopy", Journal of Eurpean Ceramic Society 21 (2001) 1581-1584.

The Institution of Electrical Engineers, Stevenage, GB; Jun. 2002; Hiranaga et al, "Nano-sized inverted domain formation in stoichiometric LiTaO/sub3/single crystal using Scanning Nonlinear Dielectric Microscopy", XP002292217.

Cho et al, "Scanning nonlinear dielectric microscopy with nanometer resolution", Journal of European Ceramic Soceity 21 (2001) 2131-2134.

Cho et al., Nano domain engineering using scanning nonlinear dielectric microscopy, Oct. 29, 2001, IEE-NANO 2001, pp. 352-357.

* cited by examiner

RECORDING/REPRODUCING HEAD

BACKGROUND OF THE INVENTION

1. Field of the Invention

The present invention relates to a recording/reproducing head for a dielectric recording medium, for recording information in microdomains in a dielectric substance of the dielectric recording medium and for reproducing information recorded in the dielectric recording medium, and relates to a method of producing the recording/reproducing head.

2. Description of the Related Art

As high-density, large-capacity recording/reproducing apparatuses of randomly accessible type, there are known an optical disk apparatus and a hard disc drive (HDD) apparatus. Moreover, a recording/reproducing technique using a scanning nonlinear dielectric microscopy (SNDM) for the nanoscale analysis of a dielectric (ferroelectric) material has been recently proposed by the inventors of the present invention.

In optical recording, an optical pickup with a laser as a light source is used. Data is recorded by forming pits that are concavo-convex on a disk surface or forming the crystal phase of a phase shift recording medium. The data is reproduced by using the difference in the reflectance of amorphous phases or using the magneto optical effect. However, the pickup is large and is not appropriate for high-speed reading, and the size of the recording pit is defined by the diffraction limit of light, so that its recording density is limited to 50 G bit/inch$^2$.

In the longitudinal recording of magnetic recording as represented by the HDD, a magnetic resistance (MR) head has been recently realized using giant magnetic resistance (GMR). In addition, perpendicular magnetic recording is used. Therefore, its recording density is expected to be larger than that of the optical disk by using. However, the recording density is limited to 1 T bit/inch$^2$ due to thermal fluctuation of magnetic recording information and the presence of a Bloch wall in a code reverse or sign change portion, even if patterned media are used considering the above cause.

Using the SNDM to measure a non-linear dielectric constant of a ferroelectric material, it is possible to detect the plus and minus of a ferroelectric domain. Moreover, the SNDM is found to have sub-nanometer resolution using an electrically conductive cantilever (or probe) which is used for an atomic force microscopy (AFM) or the like and which is provided with a small probe on its tip portion. In the SNDM, a resonance circuit is formed with the probe, an inductor, an oscillator connected with the probe, a capacitance of the dielectric (ferroelectric) material just under the probe and a return electrode which is placed near the tip portion of the probe. The return electrode is an electrode for returning an alternating electric field from the tip portion of the probe through the dielectric (ferroelectric) material. The conventional SNDM is designed to be an analysis apparatus. The return electrode used in this apparatus is a metal conductor of a ring shape of 7 mm outer diameter, 3 mm inner diameter and about 0.5 mm thickness, and it is placed so as to surround the tip portion of the probe.

However, the above-described SNDM has not been specially developed in view of a recording/reproducing apparatus and thus have such a problem that the probe is large or that assembling is complicated. Moreover, if it has a plurality of probes in order to increase a data transfer rate, the complication increases more.

SUMMARY OF THE INVENTION

It is therefore an object of the present invention to provide a recording/reproducing head for recording/reproducing data in/from a dielectric recording medium, having a simple structure, easy to produce, and appropriate for mass-production, as well as a method of producing the recording/reproducing head.

The above object of the present invention can be achieved by a recording/reproducing head for recording information in a dielectric material of a dielectric recording medium or reproducing information recorded in the dielectric recording medium, provided with: a supporting member of a longitudinal shape which is long in one direction; a first electrode, which is projective and which is disposed on one end in the one direction of the supporting member, for applying an electric field to the dielectric material; an electric conductor portion, which is disposed on a surface of the supporting member facing to the dielectric material, for taking an electric connection with the first electrode; and a second electrode disposed on the surrounding of the first electrode.

According to the recording/reproducing head of the present invention, the first electrode is formed on the supporting member. The supporting member is, for example, in the shape of a cantilever. The first electrode is an electrode for applying an electric field to the dielectric recording medium for recording/reproducing the information. More concretely, on one end of the supporting member, which contains Si, for example, there is a projection portion which will be a probe, and the surface of the projection portion is provided with a conductive film thereon. A lead wire, which is connected with the conductive film, is disposed on a surface of the supporting member with the projection portion thereon in the direction to the other end. Moreover, another conductive film is disposed so as to surround the probe and the lead wire with a space or gap. This conductive film is a return electrode for returning a high-frequency electric field applied to the dielectric recording medium from the probe. According to this recording/reproducing head having such a construction and shape, the tracing capability of the probe improves.

Incidentally, with respect to the shape of an electrode for applying an electric field, there are a pin shape, a needle-shape, a cantilever-shape and so on. The electrode having any one of these shapes is collectively referred to as a "probe" in the present application as occasion demands.

The above object of the present invention can be achieved by a recording/reproducing head for recording information in a dielectric material of a dielectric recording medium or reproducing information recorded in the dielectric recording medium, provided with: a supporting member of a longitudinal shape which is long in one direction; a projection portion disposed on one end in the one direction of the supporting member; a first electrode, which is penetrated from the tip portion of the projection portion and disposed in the central portion of the projection portion, for applying an electric field to the dielectric material; an electric conductor portion, which is disposed on a surface of the supporting member opposite to the dielectric material, for taking an electric connection with the first electrode; and a second electrode disposed on a surface of the supporting member facing to the dielectric material.

According to the recording/reproducing head of the present invention, the first electrode is formed on one end of the supporting member. The supporting member is, for example, in the shape of a cantilever. The first electrode is an electrode for applying an electric field to the dielectric recording medium for recording/reproducing the information. The supporting member contains Si, for example, and a hole for an electric conductor being disposed therein is disposed in the center of the projection portion which will be the first electrode so as to reach the both surfaces of the supporting member.

A conductive member, such as carbon nanotube, is inserted into the hole in the projection portion, and the conductive member is also exposed on the tip portion of the projection portion facing to the dielectric recording medium side. In view of abrasion resistance, diamond may be used. The diamond is preferably the one which has conductivity given by an impurity dopant. The electric continuity of the first electrode facing to the dielectric recording medium can be led to the top surface (i.e. the surface opposite to the surface facing to the dielectric recording medium) of the supporting member by the conductive member disposed in the hole, and thus the lead wire is disposed on the top surface of the supporting member.

On the other hand, a conductive film is disposed on the surface of the supporting member facing to the dielectric recording medium so as to surround the probe with a space or gap. This conductive film is a return electrode for returning a high-frequency electric field applied to the dielectric recording medium from the probe. According to the recording/reproducing head having such a construction and shape, the tracing capability of the probe improves.

The above object of the present invention can be achieved by a recording/reproducing head for recording information in a dielectric material of a dielectric recording medium or reproducing information recorded in the dielectric recording medium, provided with: a supporting member of a longitudinal shape which is long in one direction; a first electrode, which is projective and which is disposed on one end in the one direction of the supporting member, for applying an electric field to the dielectric material; a substrate, which is disposed so as to surround the first electrode, for fixing the other end of the supporting member in the one direction; an electric conductor portion, which is disposed on a surface of the substrate facing to the dielectric material, for taking an electric connection with the first electrode; and a second electrode disposed so as to surround the first electrode and the electric conductor portion.

According to the recording/reproducing head of the present invention, the substrate is in such a shape that has the supporting member and a ring-shaped member. The supporting member is, for example, in the shape of a cantilever, and is provided with a probe for recording/reproducing thereon. The ring-shaped member surrounds the supporting member with a space or gap, and has a part that fixes one end of this supporting member. As the substrate, Si may be used, for example. A conductive film is disposed on the surface of the probe, and a lead wire, which is connected with the conductive film, is disposed on the surface of the substrate facing to the dielectric recording medium. Moreover, another conductive film is disposed on the surface facing to the dielectric recording medium so as to surround the probe and the lead wire. This conductive film is a return electrode for returning a high-frequency electric field applied to the dielectric recording medium from the probe. According to the recording/reproducing head having such a construction and shape, the tracing capability of the probe improves. Using the ring-shaped member of the substrate, it is possible to fix this to a trace mechanism.

The above object of the present invention can be achieved by a recording/reproducing head for recording information in a dielectric material of a dielectric recording medium or reproducing information recorded in the dielectric recording medium, provided with: a supporting member of a longitudinal shape which is long in one direction; a projection portion disposed on one end in the one direction of the supporting member; a first electrode, which is penetrated from the tip portion of the projection portion and disposed in the central portion of the projection portion, for applying an electric field to the dielectric material; a substrate, which is disposed so as to surround the first electrode, for fixing the other end of the supporting member in the one direction; an electric conductor portion, which is disposed on a surface of the supporting member opposite to the dielectric material, for taking an electric connection with the first electrode; and a second electrode disposed on the surface of the supporting member facing to the dielectric material so as to surround the first electrode.

According to the recording/reproducing head of the present invention, the substrate is in such a shape that has the supporting member and a ring-shaped member. The supporting member is, for example, in the shape of a cantilever, and is provided with a probe for recording/reproducing thereon. The ring-shaped member surrounds the supporting member with a space or gap, and has a part that fixes one end of the supporting member. The first electrode for applying an electric field to the dielectric recording medium for recording/reproducing is formed on one end of the member of the cantilever shape. The supporting member contains Si, for example, and a hole for an electric conductor being disposed therein is disposed in the center of the projection portion which will be the first electrode so as to reach the both surfaces of the supporting member.

A conductive member, such as carbon nanotube, is inserted into the hole in the projection portion, and the conductive member is also exposed on the tip portion of the projection portion facing to the dielectric recording medium side. In view of abrasion resistance, diamond may be used. The diamond is preferably the one which has conductivity given by an impurity dopant. The electric continuity of the first electrode facing to the dielectric recording medium can be led to the top surface of the supporting member by the conductive member disposed in the hole, and thus the lead wire is disposed on the top surface of the supporting member.

On the other hand, a conductive film is disposed on the surface of the supporting member facing to the dielectric recording medium so as to surround the probe with a space or gap. This conductive film is a return electrode for returning a high-frequency electric field applied to the dielectric recording medium from the probe. According to the recording/reproducing head having such a construction and shape, the tracing capability of the probe improves.

In one aspect of the recording/reproducing head of the present invention, each of the above-described recording/reproducing heads is used as a device for recording information in/reproducing it from the dielectric recording medium on the basis of a scanning nonlinear dielectric microscopy method.

According to this aspect, the SNDM technique is applied, especially to reproducing. The SNDM reproduction technique is introduced in detail by the present inventor, Yasuo Cho, in Oyo Butsuri Vol. 67, No. 3, p327 (1998). Alternatively, it is also described in detail in Japanese Patent Application No. 2001-274346 and No. 2001-274347, etc., filed by the present inventors. Namely, in this technique, data or information is recorded in the dielectric (ferroelectric) material of the dielectric (ferroelectric) recording medium as states of the polarization of the dielectric (ferroelectric) substance. A probe scans over a dielectric (ferroelectric) material to detect the polarization states of the dielectric (ferroelectric) substance. The capacitance of the dielectric (ferroelectric) material located just under the tip of the probe is detected. This capacitance corresponds to a nonlinear dielectric constant of the dielectric (ferroelectric) substance at this part. The nonlinear dielectric constant is determined according to the polarization direction of the dielectric (ferroelectric) substance located just under the tip of the probe. Since data or information is recorded as the polarization states (more concretely, directions of the polarization of the dielectric (ferroelectric) material), the nonlinear dielectric constant corresponds to the recorded data. Namely, the capacitance of the dielectric (ferroelectric) material just under the tip of the probe corresponds to the recorded data. Therefore, the recorded data can be reproduced by detecting the capacitance of the dielectric (ferroelectric) material just under the tip of the probe. The data can be recorded by applying an electric field to the dielectric (ferroelectric) substance from the probe, or from the lower electrode formed in the dielectric (ferroelectric) substance in such a way that the polarization directions are set according to the data or information. By using SNDM, extremely high-density recording becomes possible. Incidentally, the probe is not limited to single use, such as the one for recording or the one for reproducing, but may be sharable as the one for recording and reproducing.

The above object of the present invention can be achieved by a method of producing a recording/reproducing head for recording information in a dielectric material of a dielectric recording medium or reproducing information recorded in the dielectric recording medium, provided with processes of: forming on a substrate a convex portion for a first electrode for applying an electric field to the dielectric recording medium; fabricating the substrate so as to form a supporting member for supporting the convex portion and a surrounding member surrounding the supporting member; forming a conductive film on the convex portion; forming a first conductive layer, which is connected with the conductive film formed on the convex portion, on a surface of the substrate facing to the dielectric recording medium; and forming a second conductive layer, which is electrically insulated from the first conductive layer, on the surface of the substrate facing to the dielectric recording medium.

According to the method of producing the recording/reproducing head of the present invention, the convex portion is formed on the substrate. The supporting member having, for example, a cantilever shape is formed. The convex portion is positioned at one end of the supporting member. This portion becomes a probe for recording/reproducing. A ring-shaped member is also formed so as to surround the supporting member with a space or gap. The other end of the supporting member is connected with a part of the ring-shaped member. The supporting member and the ring-shaped member are formed by fabricating the substrate. For example, a Si substrate is used. A conductive film is formed on the surface of the probe, and the first conductive layer, which is connected with the conductive film, is formed on the surface of the substrate facing to the dielectric recording medium. Moreover, the second conductive layer which will be a return electrode for returning an electric field applied by the probe is formed so as to surround the probe and the first conductive layer with a space or gap. The general etching technique, laser fabrication technique and the like can be used for the fabrication of the Si substrate, and the general thin-film formation technique and the like can be used for the formation of the conductive film.

The above object of the present invention can be achieved by a method of producing a recording/reproducing head for recording information in a dielectric material of a dielectric recording medium or reproducing information recorded in the dielectric recording medium, provided with processes of: forming on a substrate a convex portion for a first electrode for applying an electric field to the dielectric recording medium; fabricating the substrate so as to form a supporting member for supporting the convex portion and a surrounding member surrounding the supporting member; forming a hole piercing in the central part of the convex portion; disposing a conductive member in the hole; and forming a conductive layer on a surface of the substrate facing to the dielectric recording medium.

According to the method of producing the recording/reproducing head of the present invention, the convex portion is formed on the substrate. The supporting member is formed in the shape of a cantilever, for example. The convex portion is positioned at one end of the supporting member. This portion becomes a probe for recording/reproducing data or information. A ring-shaped member is also formed so as to surround the supporting member with a space or gap. The other end of the supporting member is connected with a part of the ring-shaped member. The supporting member and the ring-shaped member are formed by fabricating the substrate such as a Si substrate. The convex portion is provided with the hole piecing from the tip portion in the central portion of the convex portion, and the hole is filled with an electric conductor. The electric conductor is exposed on the tip portion of the convex portion, and becomes the probe for applying an electric field to the dielectric recording medium to record or reproduce data. A conductive layer, which will be a return electrode for returning an electric field applied by the probe, is formed on the ring-shaped portion facing to the dielectric recording medium so as to surround the convex portion with a space or gap. The general etching technique, laser fabrication technique and the like can be used for the fabrication of the Si substrate, and the general thin-film formation technique and the like can be used for the formation of the conductive film.

In one aspect of the method of producing the recording/reproducing head of the present invention, the method is provided with a process of disposing a conductive layer, which is connected with the conductive member, on a surface of the substrate opposite to the surface facing to the dielectric recording medium.

According to this aspect, the conductive layer for taking an electric connection of the probe disposed on the convex portion is disposed on the surface of the substrate opposite to the surface facing to the dielectric recording medium. Due to this conductive layer, the probe can take an electric connection on the top surface of the substrate.

In another aspect of the method of producing the recording/reproducing head of the present invention, each of the above-described methods is provided with a process of preparing a plurality of the recording/reproducing heads on the substrate and separating them to be the individual recording/reproducing heads.

According to this aspect, it is possible to produce a plurality of recording/reproducing heads in the production process held one time.

In another aspect of the method of producing the recording/reproducing head of the present invention, each of the above-described methods is provided with a process of preparing a plurality of the recording/reproducing heads on the substrate and separating them with the predetermined number of them regarding as one head.

According to this aspect, it is possible to produce the recording/reproducing head provided with a plurality of probes. Moreover, it is also possible to produce a plurality of the recording/reproducing heads having this form in the production process held one time.

The nature, utility, and further features of this invention will be more clearly apparent from the following detailed description with reference to preferred embodiments of the invention when read in conjunction with the accompanying drawings briefly described below.

DETAILED DESCRIPTION OF THE PREFERRED EMBODIMENTS

First Embodiment of Recording/Reproducing Head

Figure 1A:
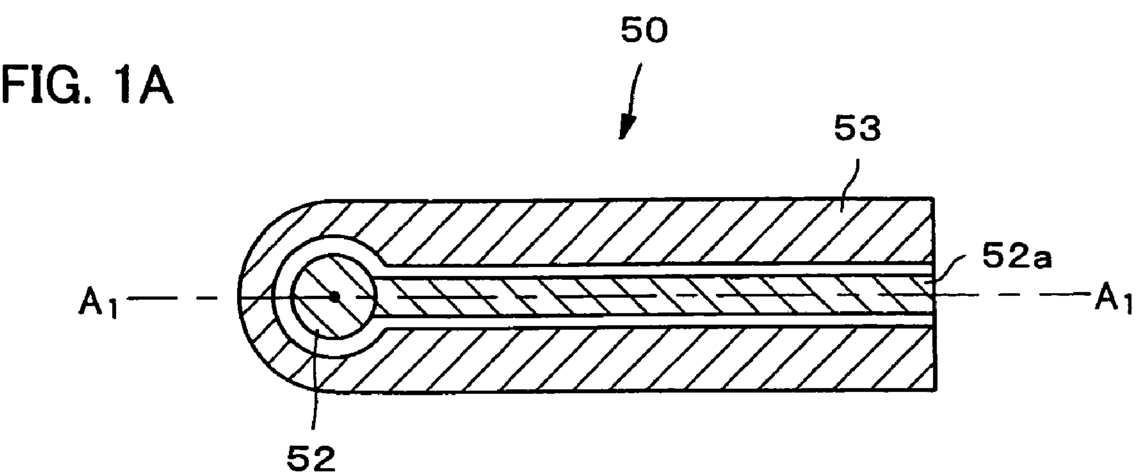
FIG. 1A is a plan view of a first embodiment of a recording/reproducing head associated with the present invention.
Figure 1B:
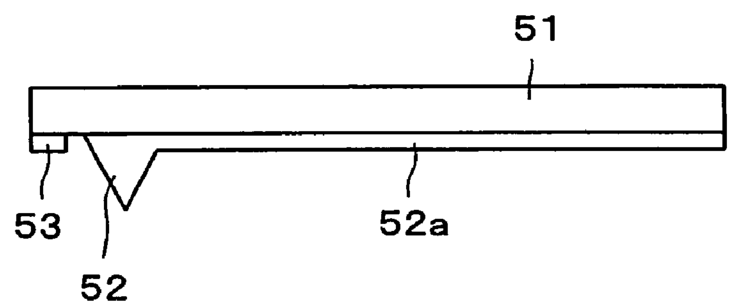
FIG. 1B is an A1-A1 cross sectional view of FIG. 1A.

The first embodiment of the recording/reproducing head associated with the present invention will be explained with reference to FIG. 1A and FIG. 1B. FIG. 1A is a plan view of the first embodiment of the recording/reproducing head associated with the present invention. FIG. 1B is an A1-A1 cross sectional view of FIG. 1A. Incidentally, FIG. 1A is the plan view from the side of a recording medium, which is in the lower part in FIG. 1B.

As shown in FIG. 1A and FIG. 1B, a recording/reproducing head 50 associated with the present invention is provided with: a substrate 51 which has a predetermined width and a predetermined thickness and which is long in one direction; a probe 52 disposed on one end in the longitudinal direction of the substrate 51; a lead wire 52*a* disposed on a surface of the substrate 51 provided with the probe 52 thereon, i.e. the lead wire 52*a* disposed on a surface facing to the ferroelectric recording medium; and a return electrode 53 which is an electric conductor disposed so as to surround the probe 52 and the lead wire 52*a*.

The probe 52 is covered with a conductive film and is connected with the lead wire 52*a*. Via the lead wire 52*a*, a signal for recording is inputted from an external device or a signal for reproducing is led to an external device.

The return electrode 53 is disposed on the surface of the substrate 51 facing to the ferroelectric recording medium so as to surround the probe 52 and the lead wire 52*a*. This return electrode 53 is earthed, and is an electrode for returning an electric field applied by the probe 52 to the ferroelectric recording medium when data recorded in the ferroelectric recording medium is reproduced.

The substrate 51 is Si, for example. The shape is a cantilever shape and is formed by the general etching technique or laser fabrication technique. The conductive film is formed by the general thin-film formation technique. Due to the cantilever shape, the tracing capability of the probe 52 to the ferroelectric recording medium improves.

Second Embodiment of Recording/Reproducing Head

Figure 2A:
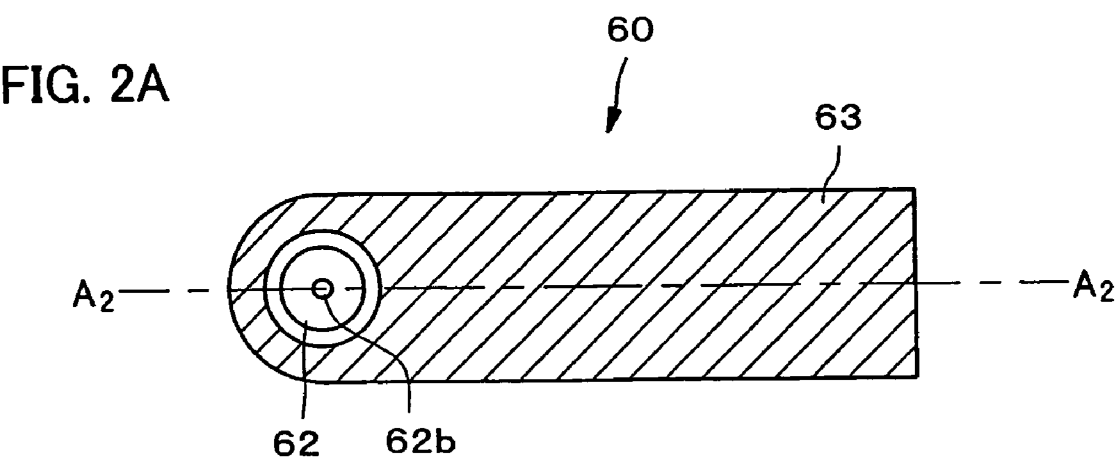
FIG. 2A is a plan view of a second embodiment of the recording/reproducing head associated with the present invention.
Figure 2B:
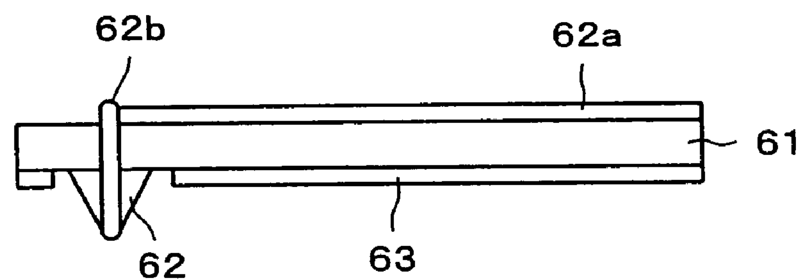
FIG. 2B is an A2-A2 cross sectional view of FIG. 2A.

The second embodiment of the recording/reproducing head associated with the present invention will be explained with reference to FIG. 2A and FIG. 2B. FIG. 2A is a plan view of the second embodiment of the recording/reproducing head associated with the present invention. FIG. 2B is an A2-A2 cross sectional view of FIG. 2A.

As shown in FIG. 2A and FIG. 2B, a recording/reproducing head 60 associated with the present invention is provided with: a substrate 61 which has a predetermined width and a predetermined thickness and which is long in one direction; a probe 62 disposed on one end in the longitudinal direction of the substrate 61; an electrode 62*b* which penetrates from the tip portion of the probe 62 to the back surface; a lead wire 62*a*, which is disposed on a surface of the substrate 61 opposite to a surface facing to the ferroelectric recording medium, for taking an electric connection with the electrode 62*b*; and a return electrode 63 which is the electric conductor disposed on the surface of the substrate 61 provided with the probe 62 thereon, i.e. the return electrode 63 disposed on the surface facing to the ferroelectric recording medium so as to surround the probe 62.

The electrode 62*b* is exposed on the tip portion of the probe 62. The electrode 62*b* is connected with the lead wire 62*a*. Via the lead wire 62*a*, a signal for recording is inputted from an external device or a signal for reproducing is led to an external device. As the material of the electrode 62*b*, carbon nanotube, diamond which has high abrasion resistance, or the like may be used, for example.

The return electrode 63 is disposed on the surface of the substrate 61 facing to the ferroelectric recording medium so as to surround the probe 62. This return electrode 63 is earthed, and is an electrode for returning an electric field applied by the probe 62 to the ferroelectric recording medium when data recorded in the ferroelectric recording medium is reproduced.

Third Embodiment of Recording/Reproducing Head

Figure 3A:
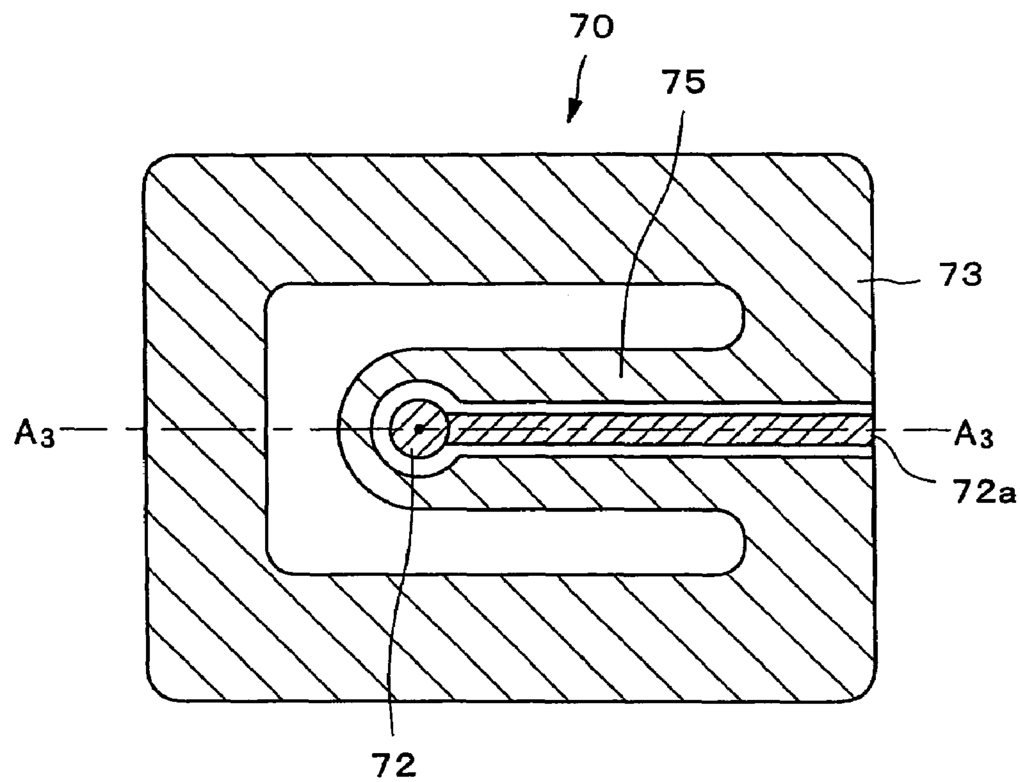
FIG. 3A is a plan view of a third embodiment of the recording/reproducing head associated with the present invention.
Figure 3B:
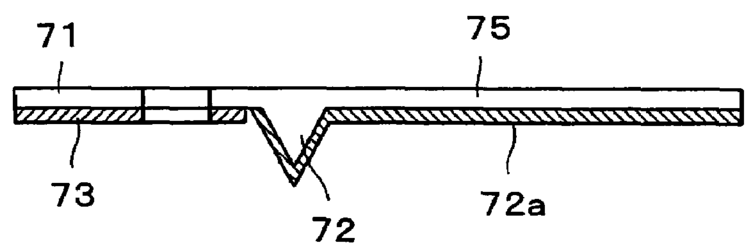
FIG. 3B is an A3-A3 cross sectional view of FIG. 3A.

The third embodiment of the recording/reproducing head associated with the present invention will be explained with reference to FIG. 3A and FIG. 3B. FIG. 3A is a plan view of the third embodiment of the recording/reproducing head associated with the present invention. FIG. 3B is an A3-A3 cross sectional view of FIG. 3A.

As shown in FIG. 3A and FIG. 3B, a recording/reproducing head 70 associated with the present invention is provided with: a substrate 71 which has a predetermined width and a predetermined thickness. The substrate 71 has a portion to form a cantilever 75 which is long in one direction and a portion which surrounds the cantilever 75.

In the substrate 71, the portion surrounding the cantilever 75 is in the shape of a ring. The probe 72 is disposed on one end of the cantilever 75 and the other end is fixed to the ring-shaped portion. There are also provided the lead wire 72*a* for taking an electric connection with the probe 72 and the return electrode 73 made of an electric conductor. The lead wire 72*a* is disposed on a surface facing to the ferroelectric recording medium. The return electrode 73 is disposed so as to surround the probe 72 and the lead wire 72*a*.

The probe 72 is covered with a conductive film and connected with the lead wire 72*a*. Via the lead wire 72*a*, a signal for recording is inputted from an external device or a signal for reproducing is led to an external device.

The return electrode 73 is disposed on the surface of the substrate 71 facing to the ferroelectric recording medium so as to surround the probe 72 and the lead wire 72*a*. This return electrode is earthed, and is an electrode for returning an electric field applied by the probe 72 to the ferroelectric recording medium when data recorded in the ferroelectric recording material is reproduced.

The substrate 71 is Si, for example. The shape is a cantilever shape and is formed by the general etching technique or laser fabrication technique. The conductive film is formed by the general thin-film formation technique. Due to the cantilever shape, the tracing capability of the probe 72 to the ferroelectric recording medium improves.

Fourth Embodiment of Recording/Reproducing Head

Figure 4A:
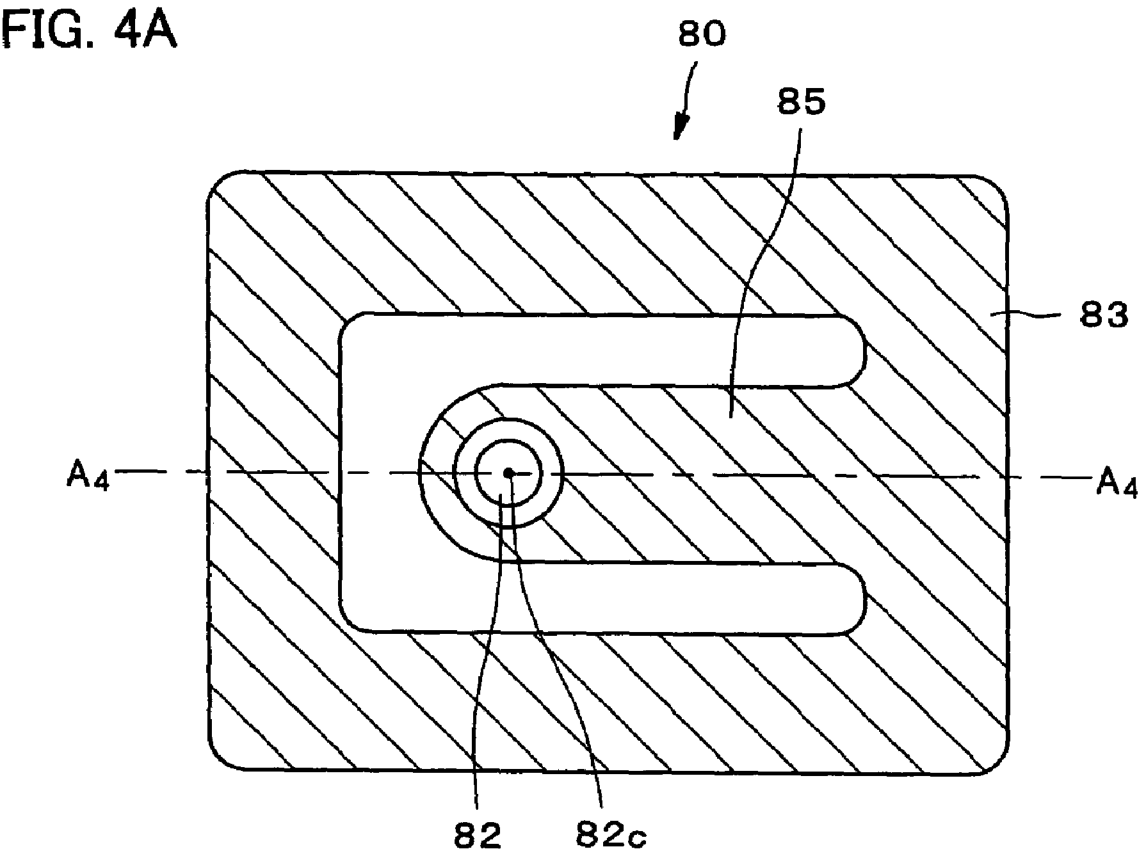
FIG. 4A is a plan view of a forth embodiment of the recording/reproducing head associated with the present invention.
Figure 4B:
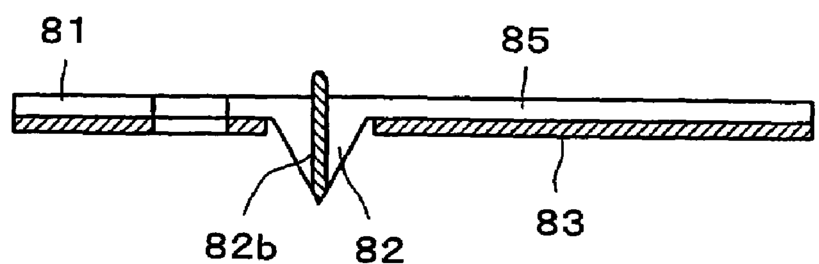
FIG. 4B is an A4-A4 cross sectional view of FIG. 4A.

The fourth embodiment of the recording/reproducing head associated with the present invention will be explained with reference to FIG. 4A and FIG. 4B. FIG. 4A is a plan view of the forth embodiment of the recording/reproducing head associated with the present invention. FIG. 4B is an A4-A4 cross sectional view of FIG. 4A.

As shown in FIG. 4A and FIG. 4B, a recording/reproducing head 80 associated with the present invention is provided with: a substrate 81 which has a predetermined width and a predetermined thickness. The substrate 81 has a portion to form a cantilever 85 which is long in one direction and a portion which surrounds the cantilever 85.

In the substrate 81, the portion surrounding the cantilever 85 is in the shape of a ring. A probe 82 is disposed on one end of the cantilever 85 and the other end is fixed to the ring-shaped portion.

In the central portion of the probe 82, there is provided a hole piercing from the tip portion of the probe 82 to the back surface of the substrate 81. In the hole, there is formed an electrode 82*b* containing an electrically conductive material, such as the carbon nanotube or the diamond which has high abrasion resistance. An electric field for recording data is applied to the ferroelectric recording medium from the electrode 82*b*. A lead wire which is connected with the electrode 82*b* may be disposed on a surface opposite to a surface facing to the ferroelectric recording medium.

A return electrode 83 is disposed on the surface of the substrate 81 facing to the ferroelectric recording medium so as to surround the probe 82. This return electrode 83 is earthed, and is an electrode for returning an electric field applied by the electrode 82*b* of the probe 82 to the ferroelectric recording medium when data recorded in the ferroelectric recording medium is reproduced.

The substrate 81 is Si, for example. The shape is a cantilever shape and is formed by the general etching technique or laser fabrication technique. The conductive film is formed by the general thin-film formation technique. Due to the cantilever shape, the tracing capability of the probe 82 to the ferroelectric recording medium improves.

First Embodiment of Method Of Producing Recording/Reproducing Head

The first embodiment of the method of producing the recording/reproducing head associated with the present invention will be explained with reference to FIG. 5A to FIG. 5C. This embodiment is about a method corresponding to the production of the recording/reproducing head 70, for example, and is also applicable to the recording/reproducing head 50.

Figure 5A:
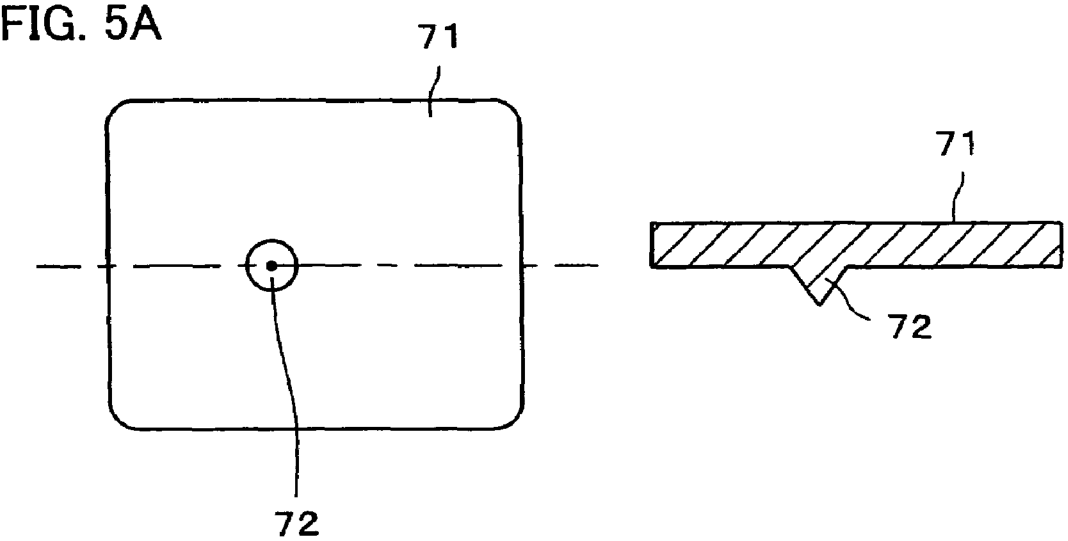
FIG. 5A to FIG. 5C are schematic diagrams showing a method of producing the recording/reproducing head shown in FIG. 3, FIG. 5A showing a process of forming a probe, FIG. 5B showing a process of forming a cantilever, and FIG. 5C showing a process of forming an electrode.

FIG. 5A shows a process of forming the probe 72 on the substrate 71 by accumulating a projection portion on the Si substrate or etching the surrounding of the projection portion with the portion left, for example.

Figure 5B:
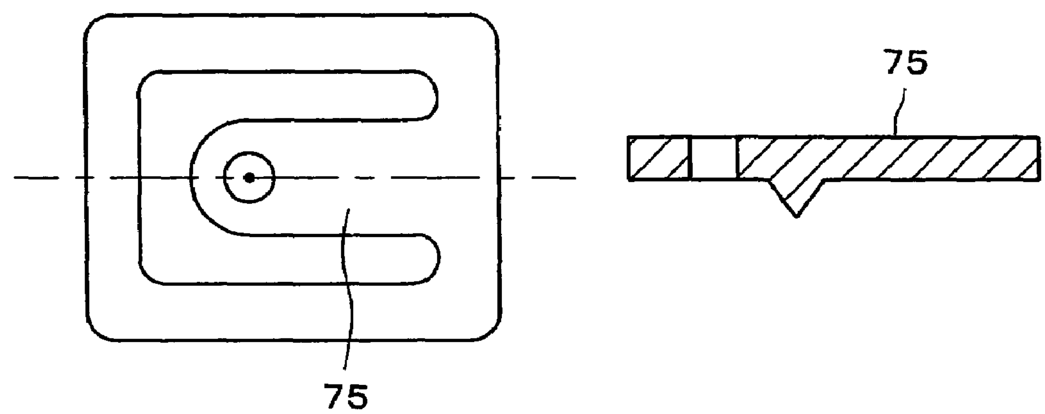

FIG. 5B shows a process, which follows FIG. 5A, of removing the surrounding of the cantilever 75 on the substrate 71 so as to form the cantilever 75 which supports the projection portion. The substrate 71 is in the ring shape to fix thereto one end opposite to the projection portion held by the cantilever 75. The cantilever 75 fixed to the substrate 71 moves vertically with this fixed point as a fulcrum.

Figure 5C:
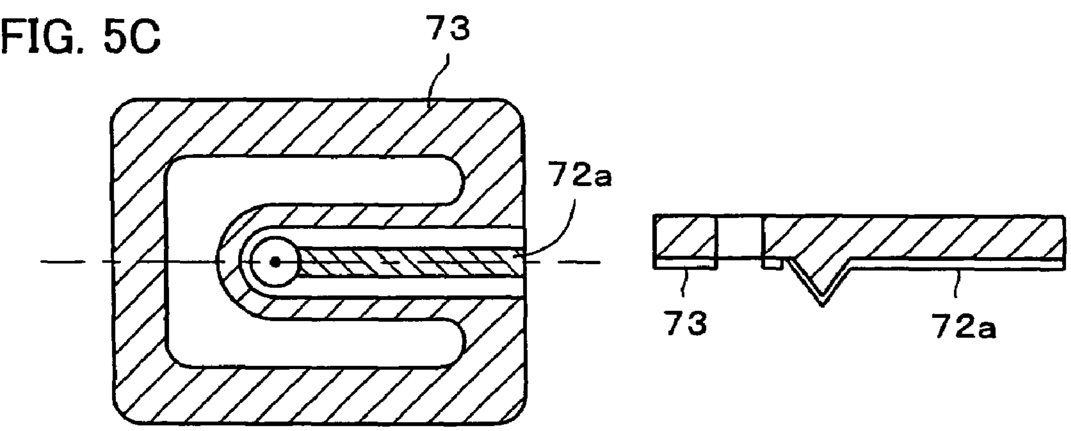

FIG. 5C shows a process, which follows FIG. 5B, of forming a conductive film on the projection portion to make the probe 72, and forming another conductive film on the surroundings of the probe 72 and the cantilever 75. The latter conductive film will be the return electrode 73 for returning an electric field applied to the ferroelectric recording medium from the probe 72.

Using the above-described production method, the recording/reproducing head 70 (50) shown in the third (first) embodiment of the recording/reproducing head can be prepared, for example.

Second Embodiment of Method of Producing Recording/Reproducing Head

The second embodiment of the method of producing the recording/reproducing head associated with the present invention will be explained with reference to FIG. 6A to FIG. 7F. This embodiment is about a method corresponding to the production of the recording/reproducing head 80, for example, and is also applicable to the recording/reproducing head 60.

Figure 6A:
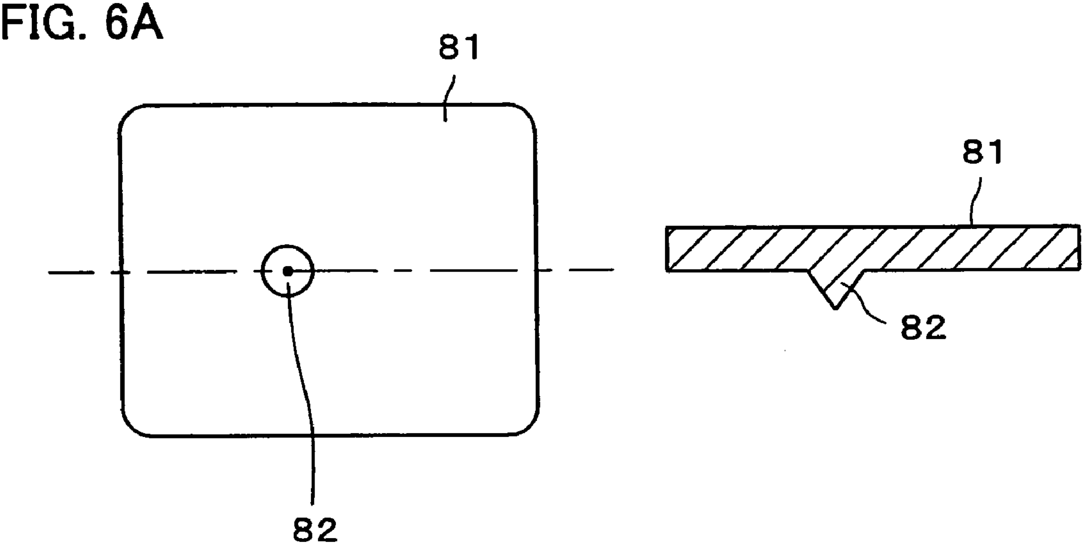
FIG. 6A to FIG. 6C are schematic diagrams showing a method of producing the recording/reproducing head shown in FIG. 4, FIG. 6A showing a process of forming a probe, FIG. 6B showing a process of forming a cantilever, and FIG. 6C showing a process of piercing a hole in the probe.

FIG. 6A shows a process of forming the probe 82 on the substrate 81 by accumulating a projection portion on the Si substrate or etching the surrounding of the projection portion with the portion left, for example.

Figure 6B:
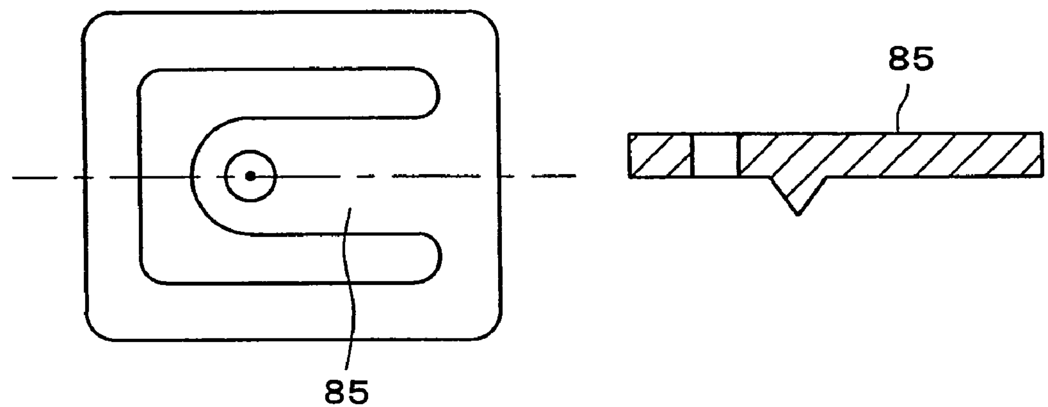

FIG. 6B shows a process, which follows FIG. 6A, of removing the surrounding of the cantilever 85 on the substrate 81 so as to form the cantilever 85 which supports the projection portion. The substrate 81 is in the ring shape to fix thereto one end opposite to the projection portion held by the cantilever 85. The cantilever 85 fixed to the substrate 81 moves vertically with this fixed point as a fulcrum.

Figure 6C:
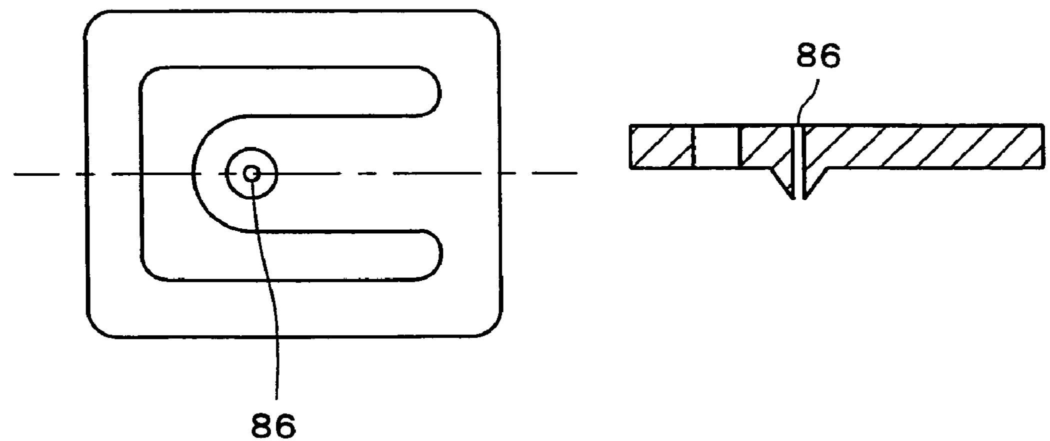

FIG. 6C shows a process, which follows FIG. 6B, of piercing a small hole 86 from the tip portion of the projection portion to the back surface of the substrate 81 by using devices of the etching, the laser fabrication, or the like, for example.

Figure 7D:
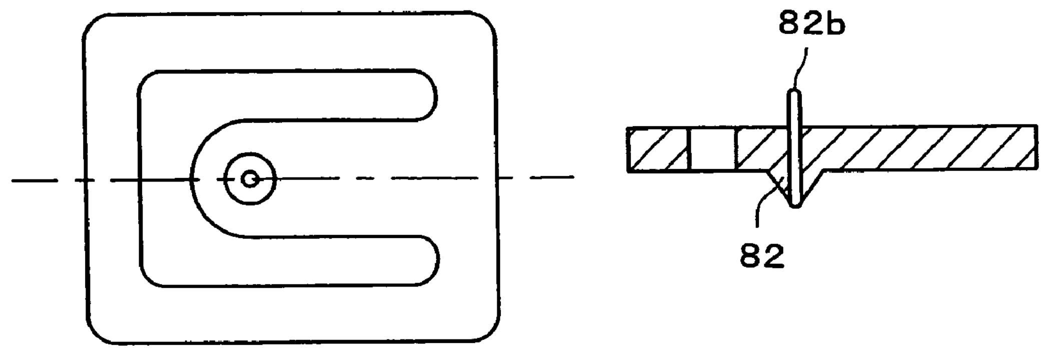
FIG. 7D to FIG. 7F are schematic diagrams showing processes following the process shown in FIG. 6C, FIG. 7D showing a process of forming an electrode in the probe hole, FIG. 7E showing a process of forming a return electrode, and FIG. 7F showing a process of forming a lead on the side of the probe.

FIG. 7D shows a process, which follows FIG. 6C, of forming the electrode 82*b* in the hole 86 as provided above by filling an electric conductor including the carbon nanotube or the like from the tip portion of the projection portion to the back surface of the substrate 81.

Figure 7E:
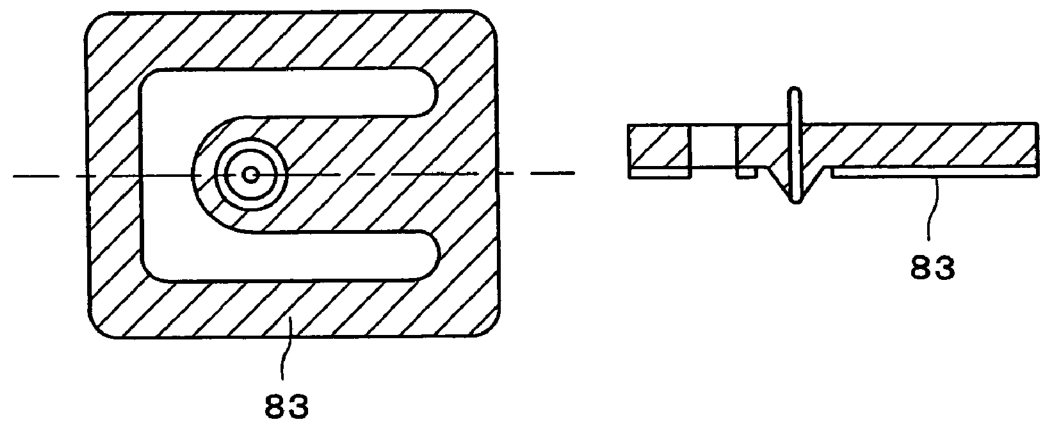

FIG. 7E shows a process, which follows FIG. 7D, of forming the conductive film on the surrounding of the probe 82 on the surface of the substrate 81 facing to the ferroelectric recording medium. This conductive film will be the return electrode 83 for returning an electric field applied to the ferroelectric recording medium from the probe 82.

Figure 7F:
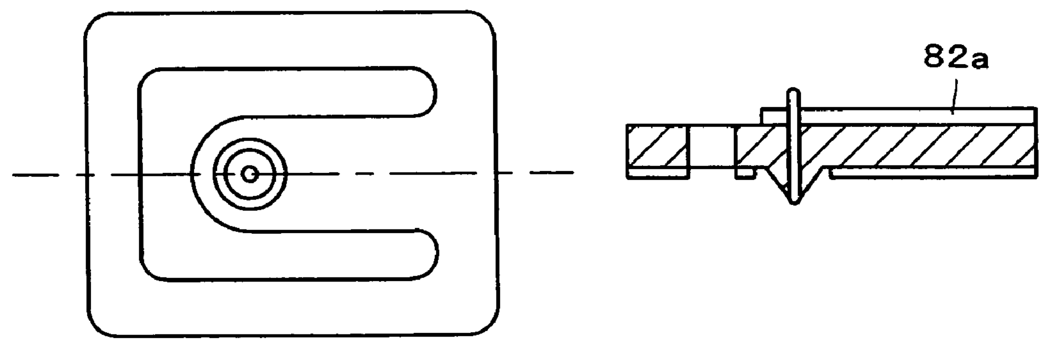

FIG. 7F shows a process, which follows FIG. 7E, of forming the lead wire 82*a* on the surface of the substrate 81 opposite to the surface facing to the ferroelectric recording medium. The lead wire 82*a* is connected with the electrode 82*b*, to which a voltage corresponding to record data is applied, on the back surface of the substrate 81. The polarization direction of the ferroelectric recording medium is determined by an electric field applied from the electrode 82*b*, so that data is recorded. In the reproduction of the data, the reproducing signal is taken out via the lead wire 82*a*.

Using the above-described production method, the recording/reproducing head 80 (60) shown in the fourth (second) embodiment of the recording/reproducing head can be prepared, for example.

Third Embodiment of Method Of Producing Recording/Reproducing Head

Figure 8:
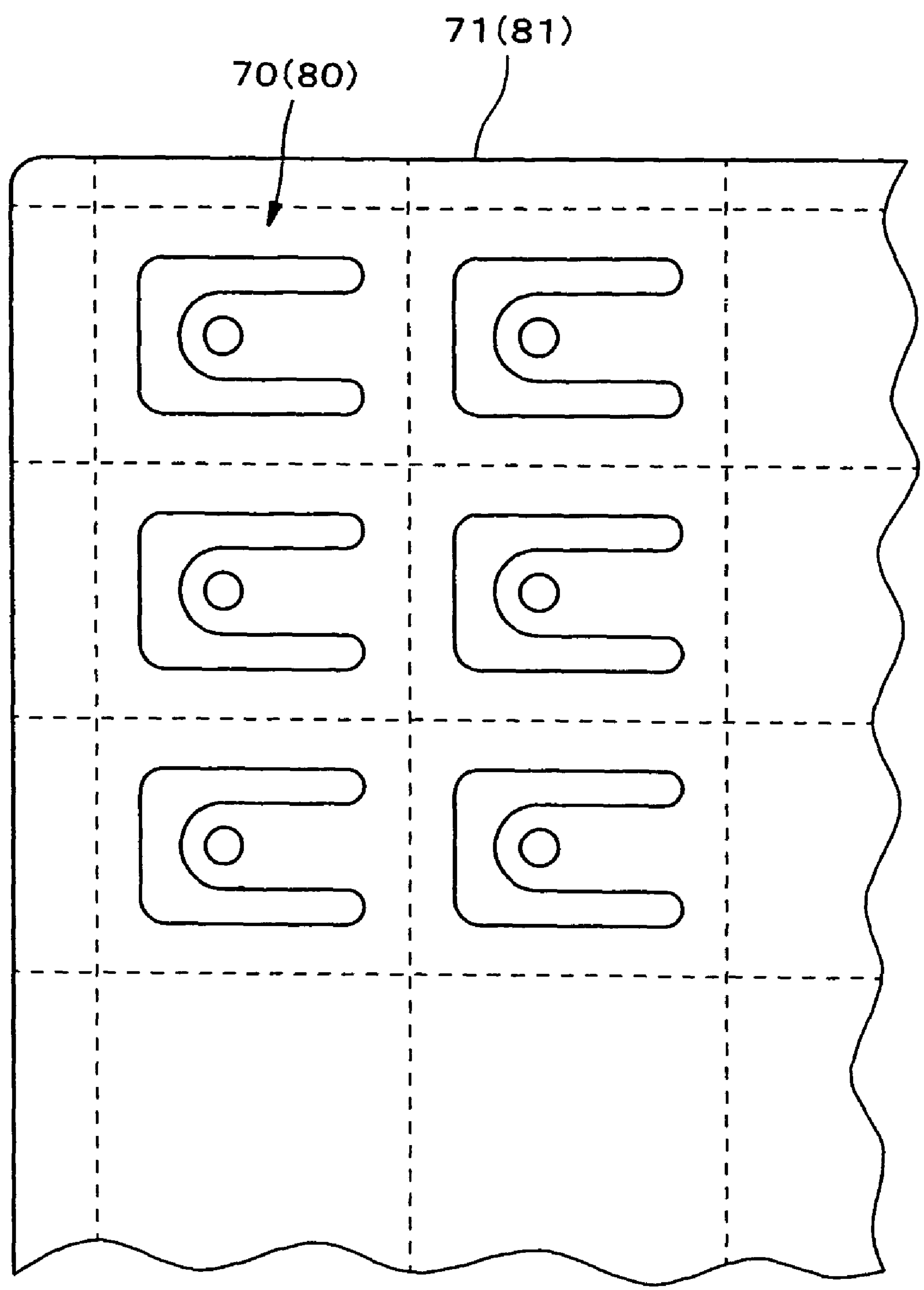
FIG. 8 is a schematic diagram showing the production of a plurality of recording/reproducing heads.

The third embodiment of the method of producing the recording/reproducing head associated with the present invention will be explained with reference to FIG. 8. This embodiment is about a method corresponding to the production of the recording/reproducing head 70 (or 80) at a time, for example.

A plurality of the recording/reproducing head 70 (or 80), which is explained in the third or forth embodiment of the recording/reproducing head, are prepared on the substrate 71(81). Then, separating them along the dotted line shown in FIG. 8 enables the formation of the individual recording/reproducing heads. By separating them in any plurality of units, it is possible to easily form the recording/reproducing heads provided with a plurality of probes.

(Ferroelectric Recording Medium to which Recording/Reproducing Head of the Present Invention is Applied)

Figure 9A:
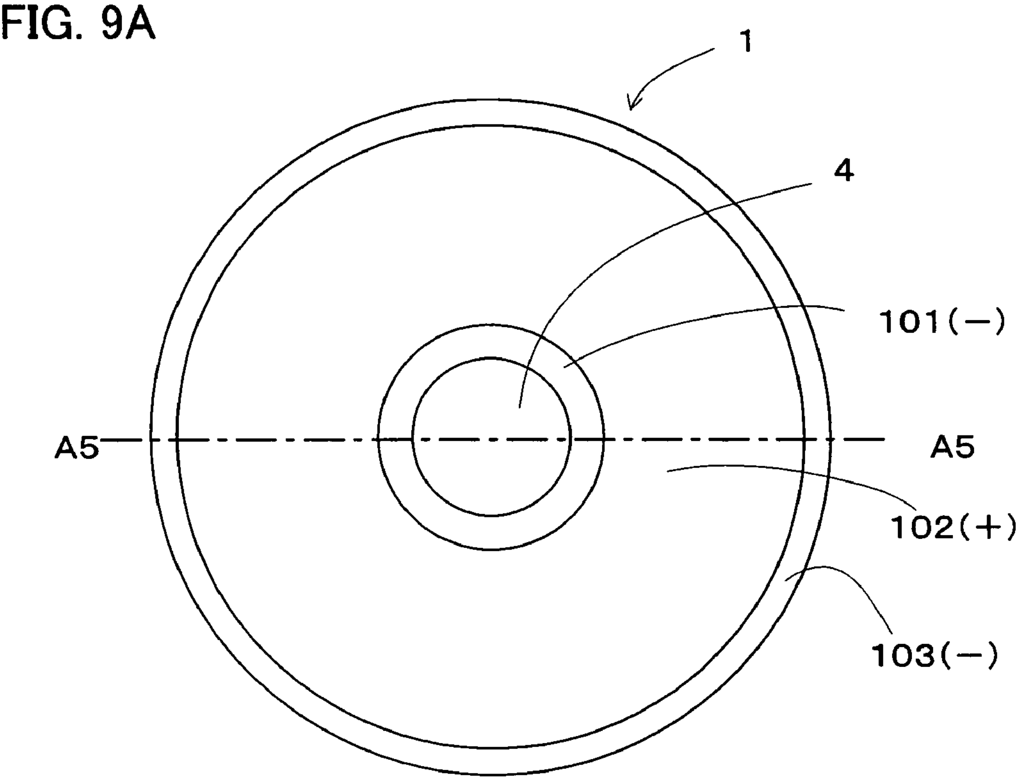
FIG. 9A is a plan view showing an example of a ferroelectric recording medium.

An example of the ferroelectric recording medium in which data is recorded/reproduced by the recording/reproducing head of the present invention will be explained with reference to FIG. 9A and FIG. 9B. As shown in FIG. 9A, a ferroelectric recording medium 1 in a disk form is provided with: a center hole 4; an inner area 101; a recording area 102; and an outer area 103, arranged concentrically from the inside in this order.

The inner area 101, the recording area 102, and the outer area 103 contain a uniform and flat ferroelectric material. If the recording area 102 has an up polarization direction, i.e. being a plus surface, the inner area 101 and the outer area 103 have down polarization directions, i.e. being a minus surface, and vice versa.

The recording area 102 is an area to record data. The recording area 102 has tracks and spaces, each of which is between two of the tracks, and is provided with areas in which control information about the recording/reproducing is recorded, in the track and the space. The inner area 101 and the outer area 103 are used to recognize the inner and outer positions of the ferroelectric recording medium 1.

Figure 9B:
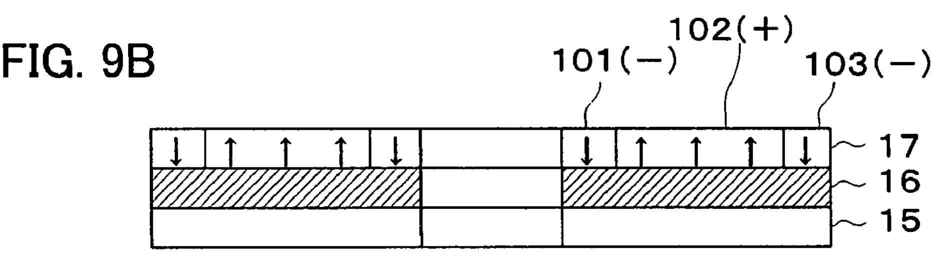
FIG. 9B is an A5-A5 cross sectional view of FIG. 9A.

As shown in FIG. 9B, the ferroelectric recording medium 1 is provided with: a substrate 15; an electrode 16 laminated on the substrate 15; and a ferroelectric material 17 laminated on the electrode 16. The inner area 101, the recording area 102, and the outer area 103 are independently polarized to be in the directions shown with arrows.

The substrate 15 may be Si, for example, which is a preferable material due to its strength, chemical stability, workability, and the like. The electrode 16 is intended to generate an electric field between the electrode 16 and the probe 11 of the recording/reproducing head and applies to the ferroelectric material 17 an electric field stronger than the coercive electric field of the ferroelectric material 17 to change and determine (set) the polarization direction. Data is recorded by changing and determining (setting) the polarization direction correspondingly to the data.

As the ferroelectric material 17, $LiTaO_3$ may be used, for example. The recording is performed with respect to the Z surface of the $LiTaO_3$, where a plus surface and a minus surface of the polarization are in a 180-degree domain relationship. Alternatively, other ferroelectric materials may be used.

Figure 10:
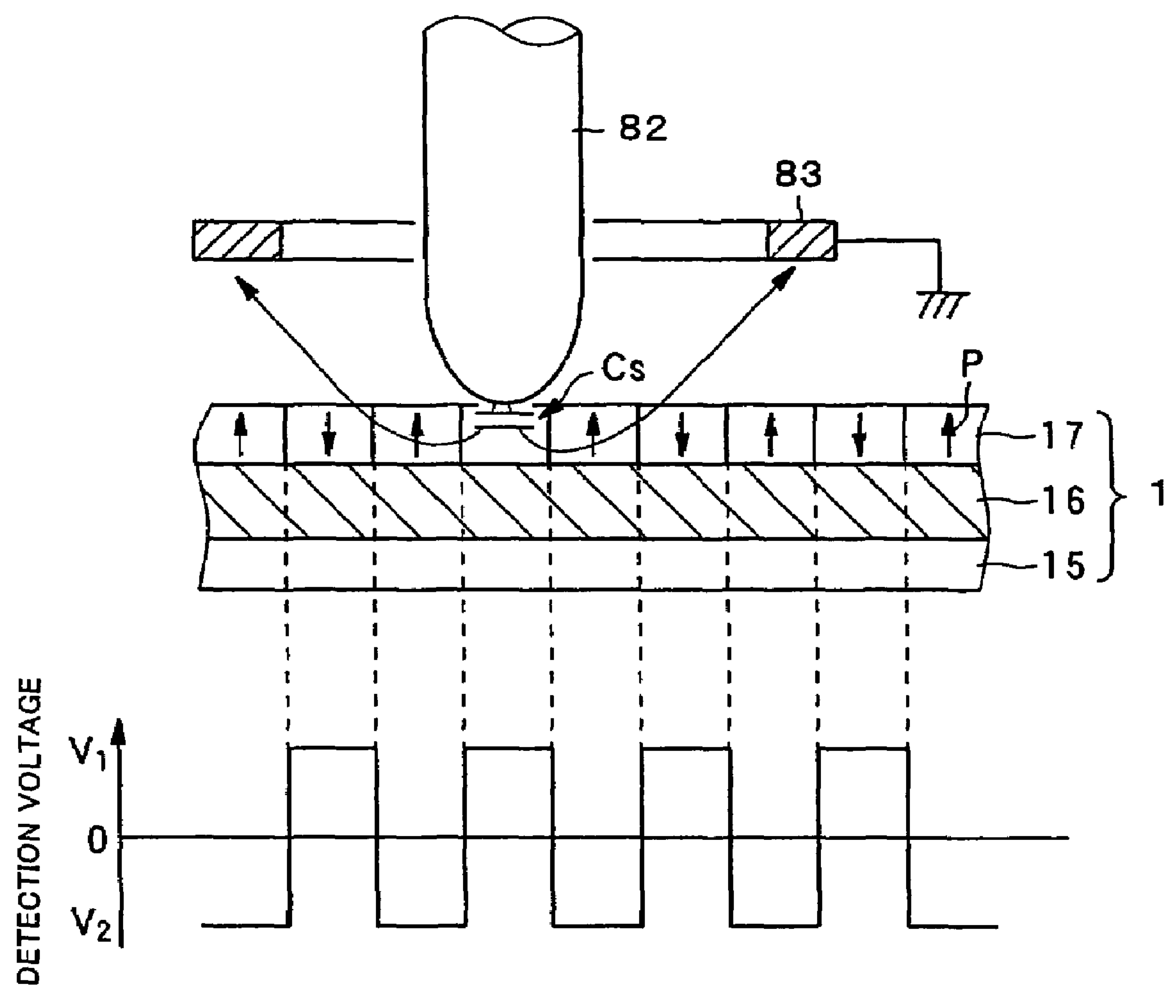
FIG. 10 is a schematic diagram for explaining information recording/reproducing with respect to a ferroelectric substance.

The principle of recording/reproducing with respect to the above-described ferroelectric recording medium 1 will be explained with reference to FIG. 10. The ferroelectric recording medium 1 is provided with: the substrate 15; the electrode 16 placed on the substrate 15; and the ferroelectric material 17 placed on the electrode 16. The ferroelectric material 17 is associated with record data depending on the directions of polarizations P.

When an electric field stronger than the coercive electric field of the ferroelectric material 17 is applied between the probe 11 and the electrode 16, the ferroelectric material 17 is polarized having directions corresponding to the direction of the applied electric field. The polarization direction corresponds to data. The return electrode 12 is an electrode for returning the electric field applied to the ferroelectric material 17 from the probe 11 in order to reproduce a signal corresponding to the polarization state by the SNDM method, and is placed so as to surround the probe 11. Incidentally, the return electrode 12 may be in any form if shaped and placed to allow the return of the electric field from the probes 11 without resistance.

The rotatable recording medium in a disc shape was explained here, but it is possible to take a method in which a rectangular ferroelectric recording medium can be driven in the X-Y direction as well.

(Dielectric Recording/Reproducing Apparatus using Recording/Reproducing Head of the Present Invention)

Figure 11:
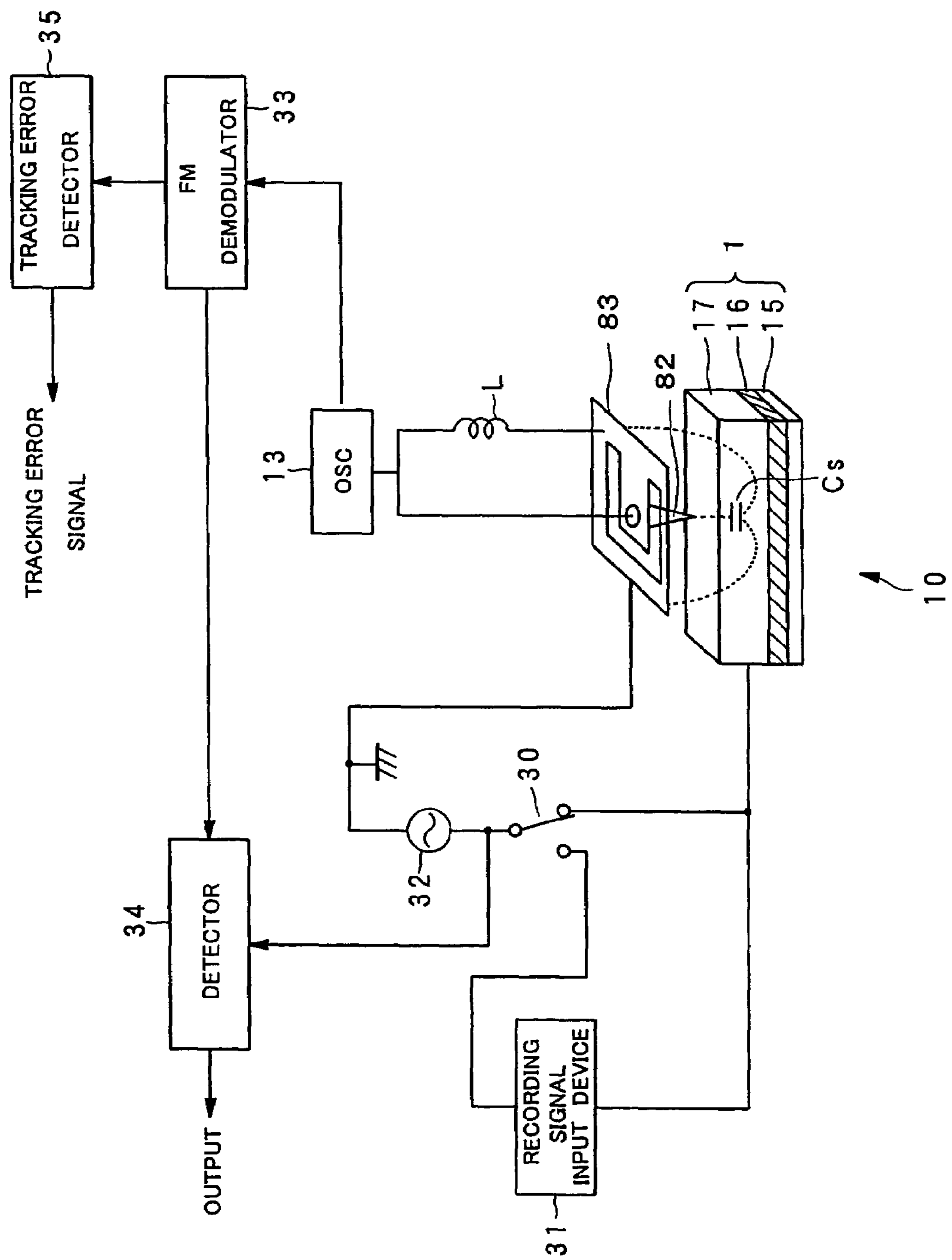
FIG. 11 is a schematic diagram showing a structure of a dielectric recording/reproducing apparatus which applies the recording/reproducing head associated with the present invention.

An example of a dielectric recording/reproducing apparatus using the recording/reproducing head of the present invention will be explained with reference to FIG. 11. In this example, the recording/reproducing head 80 of the forth embodiment of the present invention is used.

A dielectric recording/reproducing apparatus 10 is provided with: the probe 82 for applying an electric field with its tip portion facing to the ferroelectric material 17 of the ferroelectric recording medium 1; the return electrode 83 for returning the electric field applied form the probe 82; an inductor L placed between the probe 82 and the return electrode 83; an oscillator 13 which oscillates at a resonance frequency determined from the inductor L and a capacitance (e.g. a capacitance Cs shown in FIG. 10) in a portion formed in the ferroelectric material just under the probe 82 and polarized correspondingly to recorded data; a switch 30 for switching an input signal when recording; a recording signal input device 31 for converting data to be recorded to generate a signal for recording; an alternating current (AC) signal generation device 32 for generating an alternating current (AC) signal which is referred to in coherent detection; a frequency modulation (FM) demodulator 33 for demodulating a FM modulation signal modulated by the capacitance corresponding to a nonlinear dielectric constant of the ferroelectric material just under the probe 82; a detector 34 for detecting data from the demodulated signal by using the coherent detection; and a tracking error detector 35 for detecting a tracking error signal from the demodulated signal.

The probe 82 is a conductive member, or an insulating member coated with a conductive film. The tip portion facing to the ferroelectric material 17 is hemispherical, having a predetermined radius. This radius is an important factor in determining the radius of the polarization formed in the ferroelectric material 17 correspondingly to record data, so it is extremely small, on the order of 10 nm. Data is recorded by applying a voltage between the probe 82 and the electrode 16 to form in the ferroelectric material 17 a domain polarized in a predetermined direction, while the recorded data is picked up on the basis of the capacitance corresponding to the polarization.

The return electrode 83 is an electrode for returning the high-frequency electric field generated by the oscillator 13 and applied to the ferroelectric material 17 from the probe 82, and is placed so as to surround the probe 82. In the SNDM method, the change of the capacitance corresponding to a nonlinear dielectric constant of the ferroelectric material is directly detected. To detect this change of the capacitance, it is preferable that a compact oscillating circuit is formed on or above one surface of the ferroelectric recording medium. In this example, the oscillating circuit (resonance circuit) is provided with the oscillator 13, the inductor L, the probe 82, and the return electrode 83. In this oscillating circuit, the high-frequency signal flows from the probe 82 to the return electrode 83 thorough the ferroelectric material 17, as shown in FIG. 11. This route is a part of the oscillating circuit. It is preferable that this route is short in order to reduce noises due to a floating capacitance C0 and the like. The return electrode 83 is disposed so as to surround the probe 82 and the distance between the probe 82 and the return electrode 83 is very short. Therefore, the route that the high-frequency signal flows can be shortened, so that the noises can be reduced.

The inductor L is placed between the probe 82 and the return electrode 83, and may be formed with a microstripline, for example. The resonance frequency of the resonance circuit containing the oscillator 13, the inductor L, the probe 82 and the return electrode 83 is determined by the inductor L and the capacitance Cs. The inductance of the inductor L is determined so that this resonance frequency, $f=1/2\pi\sqrt{LCs}$, is about 1 GHz, for example. Incidentally, the capacitance factor to determine the resonance frequency f is not only the capacitance Cs but also the floating capacitance C0. However, since the recording/reproducing head of the present invention takes a structure for compact placement in view of the floating capacitance C0, the C0 can be assumed to be practically a constant when reproducing a signal by the SNDM. The resonance frequency f is simply expressed here as a function of the capacitance Cs and the inductor L because what changes the f in the signal reproduction is a capacitance change ΔCs of the Cs. In fact, however, the capacitance includes the floating capacitance C0, and has implications of Cs+C0.

The change of the capacitance Cs corresponds to the nonlinear dielectric constant of the ferroelectric material 17 located just under the tip of the probe 82. The nonlinear dielectric constant of the ferroelectric material 17 located just under the tip of the probe 82 is determined according to the polarization direction of the ferroelectric material 17 at this part. In the state that data was recorded in the recording area 102 of the ferroelectric material 17, the polarization directions of the ferroelectric material 17 within the recording area 102 are changed and set according to the data (e.g. a bit sequence of the data). Therefore, the change of the capacitance Cs is changed according to the data recorded in the ferroelectric material 17.

The oscillator 13 is an oscillator which oscillates at the frequency determined from the inductor L and the capacitance Cs. The oscillation frequency varies, depending on the change of the capacitance Cs. Therefore, FM modulation is performed correspondingly to the change of the capacitance Cs determined by the polarization domain corresponding to the recorded data. By demodulating this FM modulation, it is possible to read the recorded data.

When the data recorded in the ferroelectric recording medium 1 is reproduced, the probe 82 touches the ferroelectric material 17, or faces to it with a small space. Corresponding to the radius of the tip portion of the probe 82, a polarization domain is defined in the ferroelectric material 17. If the high-frequency signal is applied to this probe 82, a high-frequency electric field is generated in the ferroelectric material 17, and the high-frequency signal returns to the return electrode 83 via the ferroelectric material 17. At this time, the capacitance Cs, which corresponds to a polarization P in the ferroelectric material 17 on or under the tip portion of the probe 82, participates in the resonance circuit made with the inductance L. By this, the oscillation frequency comes to depend on the capacitance Cs. By demodulating an oscillation signal which is FM-modulated on the basis of this capacitance Cs, a detection voltage shown in FIG. 10 is outputted, and the recorded data is reproduced. On the other hand, in data recording, the recording is performed by applying a voltage corresponding to the data between the probe 82 and the electrode 16 and thus determining the polarization direction of the ferroelectric material 17. The voltage applied for the data recording generates an electric field stronger than the coercive electric field of the ferroelectric material 17.

Incidentally, it is also possible to use a plurality of probes 82. In using a plurality of probes, record data and AC signals for coherent detection at the time of reproduction are applied between the respective probe and the electrode 16. In this case, it is preferable to provide a low cut filter in order to prevent the leakage of the signals into the oscillator 13.

The switch 30 is intended to switch the input signal when recording or reproducing. The position of the switch 30 is selected so as to input only the AC signal which is referred to in the detection when reproducing, and so as to input a signal about data and the AC signal when recording.

The recording signal input device 31 converts the data to be recorded in a recording format and adds the accompanying control information, to generate a recording signal. Processing about an error correction, processing of data compression, and the like are included.

The AC signal generation device 32 generates an AC signal for coherent detection when recording (monitoring)/reproducing. If there are a plurality of probes 82, the AC signals with different frequencies are applied to the probes separately.

When recording, a recording signal from the recording signal input device 31 is superimposed on an AC signal of the AC signal generation device 32, and the superimposed signals are supplied to the electrode 16. By an electric field between the probe 82 and the electrode 16, the polarization of a domain of the ferroelectric material 17 just under the probe 82 is determined. Then, the polarization direction is fixed and becomes record data. Incidentally, the AC signal of the AC signal generation device 32 is superimposed on the recording signal. This is used for monitoring the recorded data which is now recorded while the data recording is performed. The process of monitoring the recorded data is the same as the process of reproducing the recorded data. Namely, the oscillator 13 oscillates at the resonance frequency determined from the inductor L and the capacitance Cs, and the frequency is modulated by the capacitance Cs.

The FM demodulator 33 demodulates the oscillation frequency of the oscillator 13 modulated by the capacitance Cs, and reconstructs a wave form corresponding to the polarized state of a portion on which the probe 82 traces.

The detector 34 performs the coherent detection from the signal demodulated at the FM demodulator 33 with the AC signal from the AC signal generation device 32 as a reference signal and reproduces recorded data. When recording, it can monitor the recording state.

The tracking error detector 35 detects a tracking error signal for controlling the apparatus from the signal demodulated at the FM demodulator 33. The detected tracking error signal is inputted to a tracking mechanism to control the apparatus.

Incidentally, the recording signal and the AC signal can be inputted from the side of the probe 82. In this case, it is preferable to provide a filter in order to prevent the leakage of the signals into the oscillator 13. At this time, the electrode 16 may be earthed. Moreover, if there are a plurality of probes 82, it is preferable to take this form.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2002-200043 filed on Jul. 9, 2002 including the specification, claims, drawings and summary is incorporated herein by reference in its entirety.

What is claimed is:

1. A recording/reproducing head for recording information in a dielectric material of a dielectric recording medium or reproducing information recorded in the dielectric material of the dielectric recording medium, the recording/reproducing head comprising:

a supporting member of a longitudinal shape which is long in one direction and which comprises first and second opposed surfaces;

a projection portion disposed on one end in the one direction of said supporting member and projecting from the first surface of the supporting member toward the dielectric material;

a first electrode, which penetrates a tip portion of said projection portion, for applying an electric field to the dielectric material, said first electrode extending through an opening formed in said supporting member from the second surface to the first surface thereof, and further extending to the tip portion through an opening centrally formed in the projection portion;

an electric conductor portion, which is disposed on the second surface of said supporting member, for providing an electric connection with said first electrode; and a second electrode disposed on the first surface of said supporting member so as to surround said first electrode.

2. The recording/reproducing head according to claim 1, wherein said recording/reproducing head is used as a device for reproducing the information from the dielectric recording medium on the basis of a scanning nonlinear dielectric microscopy method.

3. A recording/reproducing head for recording information in a dielectric material of a dielectric recording medium or reproducing information recorded in the dielectric material of the dielectric recording medium, the recording/reproducing head comprising:

a supporting member of a longitudinal shape which is long in one direction and which comprises first and second opposed surfaces;

a projection portion disposed on one end in the one direction of said supporting member and protecting from the first surface of the supporting member toward the dielectric material;

a first electrode, which penetrates a tip portion of said projection portion, for applying an electric field to the dielectric material, said first electrode extending through an opening formed in said supporting member from the second surface to the first surface thereof, and further extending to the tip portion through an opening centrally formed in the projection portion;

a substrate, which is disposed so as to surround said first electrode, for fixing the other end of said supporting member in the one direction;

an electric conductor portion, which is disposed on the second surface of said supporting member, for providing an electric connection with said first electrode; and a second electrode disposed on the first surface of said supporting member so as to surround said first electrode.

4. The recording/reproducing head according to claim 3, wherein said recording/reproducing head is used as a device for reproducing the information from the dielectric recording medium on the basis of a scanning nonlinear dielectric microscopy method.

5. A recording/reproducing head comprising:

a substrate having first and second opposed surfaces, the substrate including a probe disposed on the first surface thereof and an opening which extends from the second surface thereof through to a tip portion of the probe;

a first electrode extending through the opening in the substrate; and a second electrode which is disposed on the first surface of the substrate and surrounds the probe.

6. The recording/reproducing head according to claim 5, further comprising:

a lead wire disposed on the second surface of the substrate and connected to the first electrode.

7. The recording/reproducing head according to claim 5, wherein the substrate and the probe are integrally formed.

8. A scanning nonlinear dielectric microscopy apparatus comprising the recording/reproducing head of claim 5.

9. A recording/reproducing head comprising:

a substrate having first and second opposed surfaces and a central opening into which a cantilever portion thereof extends, the substrate including a probe disposed on the first surface thereof at the cantilever portion and an opening which extends from the second surface thereof through to a tip portion of the probe;

a first electrode extending through the opening in the substrate; and a second electrode which is disposed on the first surface of the substrate and surrounds the probe.

10. The recording/reproducing head according to claim 9, wherein the substrate and the probe are integrally formed.

11. The recording/reproducing head according to claim 9, further comprising:

a lead wire disposed on the second surface of the substrate and connected to the first electrode.

12. A scanning nonlinear dielectric microscopy apparatus comprising the recording/reproducing head of claim 9.

* * * * *